United States Patent
Wang et al.

(10) Patent No.: US 7,796,638 B2
(45) Date of Patent: Sep. 14, 2010

(54) PRIORITY BASED LOAD BALANCING WHEN TEAMING

(75) Inventors: Lei Wang, Round Rock, TX (US); Shriram Patwardhan, Austin, TX (US); Robert Stevens, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 528 days.

(21) Appl. No.: 11/407,457

(22) Filed: Apr. 20, 2006

(65) Prior Publication Data

US 2007/0248102 A1   Oct. 25, 2007

(51) Int. Cl.
*H04J 3/16* (2006.01)
(52) U.S. Cl. ....................................................... 370/465
(58) Field of Classification Search ............. 370/395.42
See application file for complete search history.

(56) References Cited

U.S. PATENT DOCUMENTS

| | | | |
|---|---|---|---|
| 6,658,018 B1* | 12/2003 | Tran et al. | 370/465 |
| 2002/0089691 A1* | 7/2002 | Fertlitsch et al. | 358/1.15 |
| 2004/0158651 A1* | 8/2004 | Fan et al. | 710/1 |
| 2005/0259632 A1* | 11/2005 | Malpani et al. | 370/351 |
| 2006/0029097 A1* | 2/2006 | McGee et al. | 370/468 |
| 2006/0034190 A1* | 2/2006 | McGee et al. | 370/254 |
| 2006/0209677 A1* | 9/2006 | McGee et al. | 370/216 |

* cited by examiner

*Primary Examiner*—Chirag G Shah
*Assistant Examiner*—Otis L Thompson, Jr.
(74) *Attorney, Agent, or Firm*—Haynes and Boone, LLP

(57) ABSTRACT

For a network team having a plurality of communication ports, each one of the plurality of communication ports is assigned a priority, the priority assigned being based on at least one criteria. A communications load of the network team is distributed between each one of the plurality of communication ports in accordance with its corresponding priority.

16 Claims, 4 Drawing Sheets

*FIG. 3A* — 310

| NETWORK TEAM MEMBER | SPEED | PRIORITY | LOAD |
|---|---|---|---|
| 1 | 100 MBPS | 9 | 9% |
| 2 | 1 GBPS | 91 | 91% |

*FIG. 3B* — 312

| NETWORK TEAM MEMBER | SPEED | RELIABILITY | PRIORITY | LOAD |
|---|---|---|---|---|
| 1 | 100 MBPS | LOW | 5 | 5% |
| 2 | 100 MBPS | HIGH | 10 | 10% |
| 3 | 1 GBPS | LOW | 30 | 30% |
| 4 | 1 GBPS | HIGH | 55 | 55% |

PRIORITY BASED LOAD BALANCING WHEN TEAMING

BACKGROUND

The present disclosure relates to the field of communications, and more particularly to utilization of communication bandwidth available to an information handling system.

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, entertainment, and/or global communications. In addition, IHSs may include a variety of hardware and software components that may be configured to process, store, and communicate information and may include one or more computer systems, data storage systems, and networking systems.

Many IHSs include one or more network interface adapters (NIA) (may also be referred to as network interface cards, network interface controllers (NIC) or local area network on a motherboard (LOM)) to communicate via a network. The NIA includes at least one port for forming a communications path with the network. Some NIAs may include multiple ports. Alternative network interfaces may include modems, wireless local area network (LAN) adapters, and optical interfaces. A network team may be formed by aggregating at least two ports emanating from one computer or server included in an IHS.

Presently, network communications load balancing may be typically achieved by either selecting a dedicated port to carry the full communications load or by evenly distributing the communications load across each one of the ports included in a network team. Thus, network team configurations having dissimilar port characteristics may be underutilized or in some cases may not be utilized.

Therefore, a need exists to better utilize available bandwidth of the ports included in the network team. Accordingly, it would be desirable to provide for communications throughput of a port included in an IHS through improved load balancing, absent disadvantages, some of which have been discussed above.

SUMMARY

The foregoing need is addressed by the teachings of the present disclosure, which relates to improved server performance by selective utilization of communications ports included in a network team. According to one embodiment, for improved performance of a network team having a plurality of communication ports, each one of the plurality of communication ports is assigned a priority, the priority being assigned is based on at least one criteria. A communications load of the network team is distributed between each one of the plurality of communication ports in accordance with its corresponding priority.

In one aspect, a server includes at least one NIA. Each NIA includes at least one communication port for communicating with other communications devices. Each port of the NIA is coupled to a corresponding port of the communications device. A network team is configured to include at least two ports of the one or more NIAs. The server includes a network team controller coupled to the NIA for coordinating and controlling flow of data and loading within a network team and/or across network teams. Each one of the plurality of communication ports included in the network team is assigned a priority, expressed as an integer between 0 and 100. The network team controller distributes a communication load of the network team in accordance with the priority.

Several advantages are achieved according to the illustrative embodiments presented herein. The embodiments advantageously provide for empowering a user to optimize the communications performance and simplify maintenance of an IHS such as a server. The improvement advantageously prioritizes each one of a plurality of communication ports based on one or more quality of service (QOS) and/or performance criteria such as network throughput, CPU utilization, and reliability to best utilize the available communications bandwidth. The priority, which may be configured to have a default value, is dynamically and automatically modifiable to adapt to the changing characteristics of the NIAs of the IHS.

BRIEF DESCRIPTION OF THE DRAWINGS

FIG. 3A illustrates a table for configuration of priority and load balancing within a network team based on one performance criteria described with reference to FIG. 2, according to an embodiment.

FIG. 3B illustrates a table for configuration of priority and load balancing within a network team based on multiple performance criteria described with reference to FIG. 2, according to an embodiment.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices, boards, cards, modules, blocks, and/or components described herein may be implemented as hardware (including discrete components, integrated circuits and systems-on-a-chip 'SOC'), firmware (including application specific integrated circuits and programmable chips) and/or software or a combination thereof, depending on the application requirements.

As described above, network communications load balancing may be typically achieved by either selecting a dedicated port to carry the full communications load or by evenly distributing the communications load across each one of the ports included in a network team. Thus, network team configurations having dissimilar port characteristics may be underutilized or in some cases not utilized. Therefore, a need exists to better utilize available bandwidth of the ports included in the network team. According to one embodiment, for improved performance of a network team having a plurality of communication ports, each one of the plurality of communication ports is assigned a priority, the priority being assigned is based on at least one criteria. A communications load of the network team is distributed between each one of the plurality of communication ports in accordance with its corresponding priority.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, servers, personal digital assistants, cellular phones, gaming consoles, a network storage device, or any other suitable device and may vary in size, shape, performance, functionality, and price. The IHS may include random access memory (RAM), one or more processing resources such as central processing unit (CPU) or hardware or software control logic, ROM, and/or other types of nonvolatile memory (NVM). Additional components of the IHS may include one or more disk drives, one or more network ports for communicating with external devices as well as various input and output (I/O) devices, such as a keyboard, a mouse, and a video display. The IHS system may also include one or more buses operable to receive/transmit communications between the various hardware components.

Figure 1:
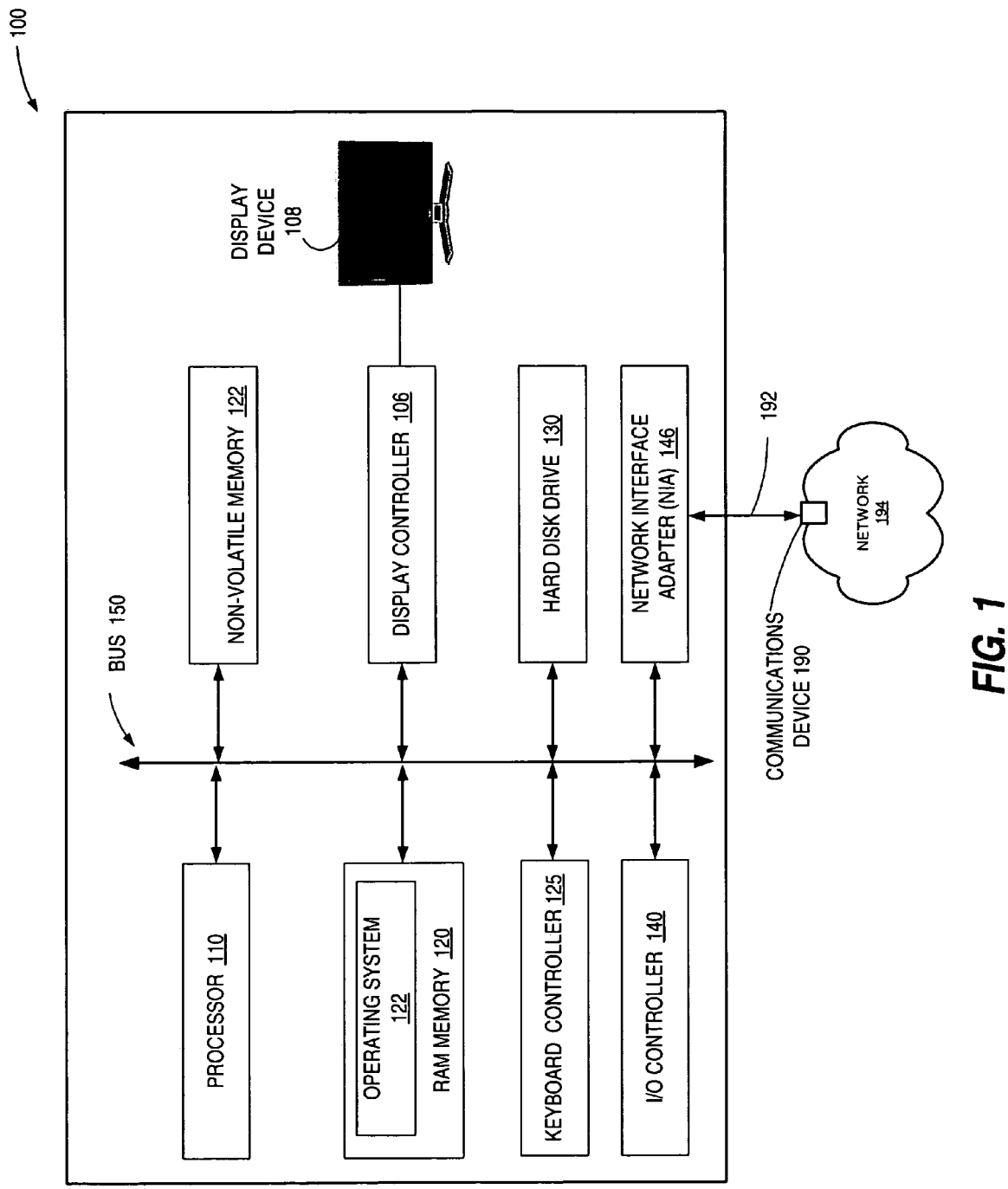
FIG. 1 illustrates a block diagram of an IHS having improved communications performance, according to an embodiment.

FIG. 1 illustrates a block diagram of an IHS 100, according to an embodiment. The IHS 100 includes a processor 110, a system RAM 120 (also referred to as main memory), a NVM 122 memory, a display controller 106 coupled to a display device 108, a keyboard controller 125, and an I/O controller 140 for controlling various other I/O devices. For example, the I/O controller 140 may include a cursor device controller and/or a serial I/O controller. It should be understood that the term "information handling system" is intended to encompass any device having a processor that executes instructions from a memory medium.

The IHS 100 is shown to include a hard disk drive 130 connected to the processor 110, although some embodiments may not include the hard disk drive 130. In a particular embodiment, the IHS 100 may include additional hard disks. The processor 110 communicates with the system components via a bus 150, which includes data, address and control lines. In one embodiment, the IHS 100 may include multiple instances of the bus 150. In an exemplary, non-depicted embodiment, not all devices shown may be directly coupled to the bus 150. The multiple instances of the bus 150 may be in compliance with one or more proprietary standards and/or one or more industry standards such as PCI, PCIe, ISA, USB, SMBus, and similar others.

An NIA 146 may be connected to the bus 150 to exchange information between the IHS 100 and a network 194. The network 194 includes a communications device 190 such as a network switch, a router, a bridge and/or another computer to electrically couple the IHS 100 and the network 194. The NIA 146 may be coupled to the communications device 190 via a wired and/or wireless communications link 192. The communications link 192 may be electrical or optical. Although not shown, the IHS 100 may include additional NIA cards, with each NIA having at least one communication port coupled to a corresponding communication port of the communications device 190 to establish additional communication links. Each port may be configured to support full duplex communication with both transmit and receive capabilities in one physical link. Additional detail of the NIA 146 and the communications device 190 is described with reference to FIG. 2.

The processor 110 is operable to execute the computing instructions and/or operations of the IHS 100. The memory medium, e.g., RAM 120, preferably stores instructions (also known as a "software program") for implementing various embodiments of a method in accordance with the present disclosure. An operating system (OS) 122 of the IHS 100 is a type of software program that controls execution of other software programs, referred to as application software programs. In various embodiments the instructions and/or software programs may be implemented in various ways, including procedure-based techniques, component-based techniques, and/or object-oriented techniques, among others. Software may also be implemented using C, XML, C++ objects, Java and Microsoft's .NET technology.

Figure 2:
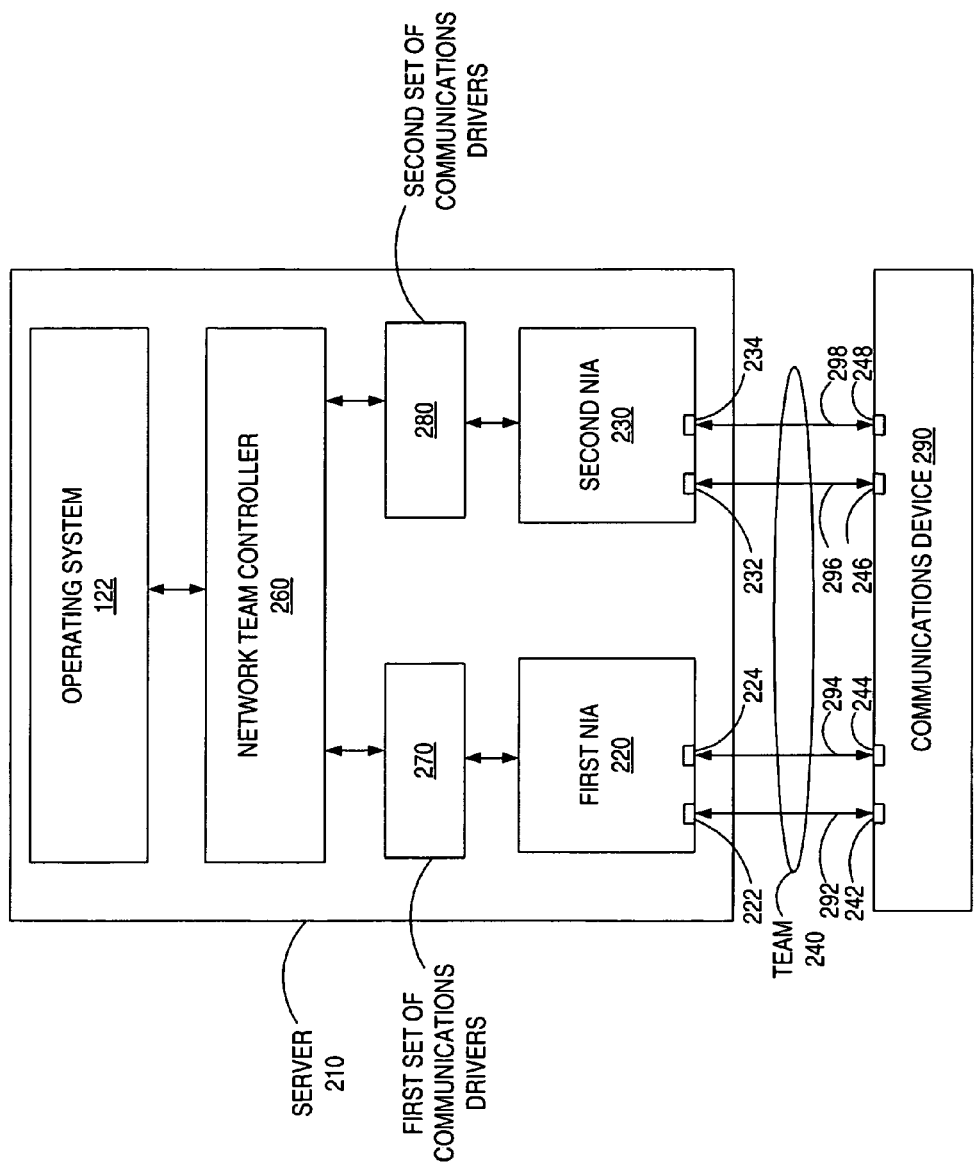
FIG. 2 illustrates a block diagram of a server having a plurality of NIA cards coupled to a communications device, according to an embodiment.

FIG. 2 illustrates a block diagram of a server having a plurality of NIA cards coupled to a communications device, according to an embodiment. In the depicted embodiment, a server 210 includes a first NIA 220 and a second NIA 230. Each one of the two NIAs 220 and 230 includes at least one communication port. The two NIAs 220 and 230 are coupled to the communications device 290 via a plurality of communication ports. The two NIAs 220 and 230 may be substantially similar or may be different. In a particular embodiment, the first NIA 220 may be a 100 megabits/second (Mbps) Ethernet card and the second NIA 230 may be a 1 gigabits/second (Gbps) Ethernet card. In another embodiment, each one of the NIAs 220 and 230 may be substantially similar to the NIA 146 described with reference to FIG. 1 in terms of functionality, e.g., provide a communications interface to a network, but may have dissimilar performance related properties or attributes such as speed and reliability. In a particular embodiment, the server 210 is substantially similar to the IHS 100 and the communications device 290 is substantially similar to the communications device 190 described with reference to FIG. 1.

In the depicted embodiment, the first NIA 220 has a first communications port 222 and a second communications port 224. Similarly, the second NIA 230 has a third communications port 232 and a fourth communications port 234. Each port of the NIA, e.g., port 222, 224, 232 and 234, is coupled to a corresponding port, e.g., port 242, 244, 246 and 248, of the communications device 290 to establish a corresponding link, e.g., link 292, 294, 296 and 298. As an example, the first link 292 couples the first communications port 222 with a corresponding first port 242 of the communications device 290. Although each one of the NIAs 220 and 230 is shown to have two communication ports, it is understood that each one of the NIAs 220 and 230 include at least one communication port. In the depicted embodiment, the plurality of communication ports includes the first, second, third, and fourth communication ports 222, 224, 232 and 234. In a particular embodiment, the plurality of communication ports are aggregated to form a network team 240. Thus, the network team 240 forms a logical or virtual communications port. Each one of the plurality of communication ports is assigned a priority based on one or more criteria. The criteria may include performance and/or quality of service (QOS), which may be measured in bits/second and a reliability factor. Additional criteria may include throughput, CPU utilization, interrupt rate, and administrative concerns or preferences. A communications load for the server 210 is distributed between each one of the plurality of communication ports in accordance with its priority. The communications load is indicative of a demand for transferring data between the server 210 and the network 194.

In the depicted embodiment, the first NIA 220 interfaces to a first set of communications drivers 270 and the second NIA 230 interfaces to a second set of communications drivers 280. The set of communications drivers 270 and 280 may include one or more software drivers corresponding to each port. A network team controller 260, which interfaces with the first set of communications drivers 270 and the second set of communications drivers 280, is operable to configure one or more network teams such as the network team 240. The network team controller 260 may also be referred to as an intermediate driver, a traffic director or a network team coordinator. The configuration includes assigning the priority to each one of the plurality of communication ports included in each of the network teams. The network team controller 260 interfaces with the OS 122 of the server 210. Additional details of assigning the priority to each one of the plurality of communication ports and the load distribution based on the priority is described with reference to FIG. 3.

As described earlier, communication packets sent to the logical communication port are dispatched to a selectable one of the physical communication ports 222, 224, 232 and 234 in the network team 240 and communication packets arriving at any of the physical communication ports 222, 224, 232 and 234 are automatically directed to the configured logical communication port. In a particular embodiment, the network team 240 is formed by grouping at least two of the plurality of communication ports. The at least two ports may reside on the same NIA or may reside on separate NIAs. A communication port may not be a simultaneous member of two network teams. In an exemplary, non-depicted embodiment, the plurality of communication ports 240 may be grouped into 2 network teams with each network team having one port from each NIA or with two ports from the same NIA.

FIG. 3A illustrates a table 310 for configuring priority and load balancing within a network team based on one performance criteria described with reference to FIG. 2, according to an embodiment. In the depicted embodiment, the first NIA 220 is a 100 Mbps Ethernet card and the second NIA 230 is a 1 Gbps Ethernet card. A network team 310 is aggregated to include the first communications port 222 of the first NIA 220 as a first member and the third communications port 232 of the second NIA 230 as a second member. In this embodiment, the priority for each one of the plurality of communication ports is configured or assigned as a default by a predefined function and is expressed as an integer varying from 0 to 100. A sum of the priority of each one of the plurality of communication ports is equal to 100. In a particular embodiment, the predefined function is a ratio of the individual speed of a network team member to the combined port speed for the network team. Thus, priority for the first communications port 222 is [100/(100+1000)] rounded to the nearest integer is 9 and the priority for the second communications port 232 is [100−9] or 91. In this embodiment, the distribution load is distributed in accordance with the priority assigned to each port. Thus, the first communications port 222 carries 9% of the total load and the second communications port 232 carries 91% of the total load.

The initial or default value for the priority may be changed dynamically and in real-time by a user and/or by software. The re-configuring of the priority may occur in response to an event affecting the one or more criteria such as a hardware problem with the first communications port 222 reducing its speed to 10 Mbps. As another example, priority may be dynamically assigned based on real-time network statistics data collected by the server 210. In a particular embodiment, a communications port which may no longer be a participant in the network team may be assigned a 0 priority. A 0 priority may be used for indicating a break in the network connections, such as an unplugged cable, for performing maintenance, and/or for servicing the card.

Although speed of the communications ports is used as a criteria for assigning priority, it is contemplated that the priority may be assigned based on various performance and/or QOS criteria such as hardware offload capability of the NIA, traffic or packet type (e.g., TCP/UDP), reliability, administrative considerations (type of card, policy, brand). Additional details of configuring priority based on multiple criteria are described with reference to FIG. 3B.

FIG. 3B illustrates a table 312 for configuring priority and load balancing within a network team based on two performance criteria described with reference to FIG. 2, according to an embodiment. In the depicted embodiment, the first NIA 220 is a 100 Mbps Ethernet card and the second NIA 230 is a 1 Gbps Ethernet card. A network team 320 is formed to include the first communications port 222 as a first member, the second communications port 224 as a second member, the third communications port 232 as a third member and the fourth communications port 234 as a fourth member. In a particular embodiment, the network team 320 is substantially the same as the network team 240 described with reference to FIG. 2.

In the depicted embodiment, the priority for each one of the plurality of communication ports is assigned as a function of multiple performance and/or QOS criteria such as speed and reliability and is expressed as an integer varying from 0 to 100. A sum of the priority of each one of the plurality of communication ports is equal to 100. In a particular embodiment, the priority for each one of the plurality of communication ports is assigned individually provided the sum of all priorities configured for the network team 320 add up to 100. In the depicted embodiment, the first communications port 222, the second communications port 224, the third communications port 232 and the fourth communications port 234 have been respectively assigned a value of 5, 10, 30 and 55 for the priority. In this embodiment, the distribution load is distributed in accordance with the priority assigned to each port. Thus, each of the plurality of communication ports 222 respectively carries 5%, 10%, 30% and 55% of the total load.

The initial configured or assigned value for the priority may be changed dynamically and in real-time manually and/or programmatically, e.g., by a user and/or by software. The re-configuring of the priority may occur in response to an event affecting one or more criteria such as a hardware reliability problem with the first communications port 232 making it unavailable. As another example, priority may be dynamically assigned based on real-time network statistics data collected by the server 210. In a particular embodiment, a communications port which may no longer be a participant in the network team may be assigned a 0 priority. A 0 priority may be used for maintenance or servicing of the card.

Figure 4:
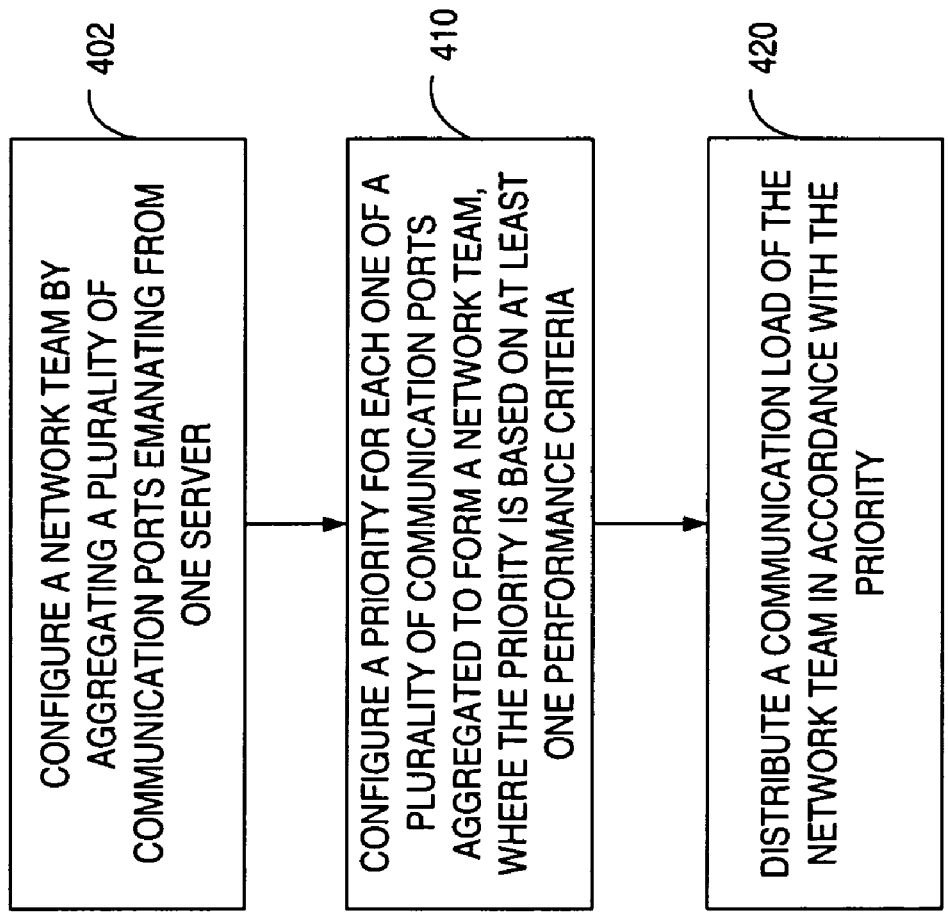
FIG. 4 is a flow chart illustrating a method for improved performance of a network team having a plurality of communication ports, according to an embodiment.

FIG. 4 is a flow chart illustrating a method for improved performance of a network team having a plurality of communication ports, according to an embodiment. In a particular embodiment, the network team is substantially the same as the network team 240 described with reference to FIG. 2, the network teams 310 described with reference to FIG. 3A and the network team 320 described with reference to FIG. 3B. At step 410, a priority for each one of the plurality of communication ports of the network team is configured based on at least one criteria. At step 420, a communication load of the network team is distributed between each one of the plurality of communication ports in accordance with the priority.

Various steps described above may be added, omitted, combined, altered, or performed in different orders. In a particular embodiment, a step 402 may be added prior to step 410 for configuring a network team having a plurality of network team communications ports emanating from a single server.

The illustrative embodiments advantageously provide for empowering a user to optimize the communications performance and simplify maintenance of an IHS such as a server. The embodiments advantageously prioritize each one of a plurality of communication ports based on one or more QOS and/or performance criteria such as speed, CPU utilization, and reliability to best utilize the available communications bandwidth. The priority, which may be configured to have a default value, is dynamically and automatically modifiable to adapt to the changing characteristics of the NIAs of the IHS.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for improved performance of a network team having a plurality of communication ports, the method comprising:
 configuring a priority for each one of the plurality of communication ports of the network team, wherein the priority of a given communication port in the plurality of communication ports is equal to a ratio of an individual speed of the given communication port to a combined port speed for the network team;
 distributing a communication load of the network team in accordance with the priority such that each communication port carries a percentage of the communications load that is equal to the priority configured for that communications port; and
 dynamically modifying the priority of at least one communication port in response to real-time network statistics indicating a change in the individual speed at which that at least one communication port is carrying a first percentage of the communication load such that at least one communication port carries a second percentage of the communication load that is different from the first percentage of the communication load.

2. The method of claim 1, wherein the plurality of communication ports provide communications between an information handling system (IHS) and a communications device.

3. The method of claim 2, wherein the communications load is indicative of a demand for transferring data between the IHS and the communications device.

4. The method of claim 2, wherein the communications device is at least one of a switch, a router, a bridge, a gateway and a computer.

5. The method of claim 2, wherein the communications is provided by at least one network interface adapter (NIA) included in a server, wherein the NIA includes at least one port included in the network team, wherein the NIA is coupled to the communications device via the at least one port included in the plurality of communication ports.

6. The method of claim 5, wherein the priority is also based on at least one of a reliability factor of the at least one NIA, a CPU utilization factor, an interrupt rate, and an administrative factor.

7. The method of claim 1, wherein the priority of each one of the plurality of communication ports is expressed as an integer, wherein the integer varies from 0 to 100.

8. The method of claim 1, wherein a sum of the priorities of the plurality of communication ports is equal to 100.

9. The method of claim 1, wherein the plurality of communications ports comprises a first communications port and a second communications port, and wherein the priority of the first communications port is equal to a ratio of a maximum individual speed of the first communication port to a maximum combined port speed for the network team such that first communications port carries a percentage of the communications load that is equal to the ratio of the maximum individual speed of the first communication port to the maximum combined port speed for the network team, and wherein the priority of the second communications port is equal to a ratio of a maximum individual speed of the second communication port to the maximum combined port speed for the network team such that second communications port carries a percentage of the communications load that is equal to the ratio of the maximum individual speed of the second communication port to the maximum combined port speed for the network team.

10. The method of claim 1, wherein the priority of a selected one of the plurality of communication ports is configurable to have a 0 value in response to the selected one being excluded from the network team.

11. The method of claim 1, wherein the configuring of the priority occurs in real-time in response to an event affecting the priority.

12. A server comprising:
 a plurality of network interface adapters (NIAs), wherein each of the plurality of NIAs includes at least one communication port; and
 a network team controller coupled to the plurality of NIAs, wherein the network team controller is operable to control an operation of a network team formed by grouping a plurality of communication ports included in the plurality of NIAs, wherein each of the plurality of communication ports included in the network team is assigned a priority such that the priority of a given communication port in the plurality of communication ports is equal to a ratio of an individual speed of the given communication port to a combined port speed for the network team, and wherein the network team controller distributes a communication load of the network team in accordance with the priority such that each communication port carries a percentage of the communications load that is equal to the priority configured for that communications port, and wherein the network team controller dynamically modifies the priority of at least one communication port in response to real-time network statistics indicating a change in the individual speed at which that at least one communication port is carrying a first percentage of the communication load such that at least one communication port carries a second percentage of the communication load that is different from the first percentage of the communication load.

13. The server of claim 12, wherein the plurality of communications ports comprises a first communications port and a second communications port, and wherein the priority of the first communications port is equal to a ratio of a maximum individual speed of the first communication port to a maximum combined port speed for the network team such that first communications port carries a percentage of the communications load that is equal to the ratio of the maximum individual speed of the first communication port to the maximum combined port speed for the network team, and wherein the priority of the second communications port is equal to a ratio of a maximum individual speed of the second communication port to the maximum combined port speed for the network team such that second communications port carries a percentage of the communications load that is equal to the ratio of the maximum individual speed of the second communication port to the maximum combined port speed for the network team.

14. An information handling system (IHS) comprising:
   a processor;
   a network interface adapter (NIA) coupled to the processor, wherein the NIA includes at least one port, wherein the at least one port is included in a plurality of communication ports aggregated to form a network team, wherein the processor is operable to execute instructions, stored on a memory medium, for:
      configuring a priority for each one of the plurality of communication ports of the network team, wherein the priority of a given communication port in the plurality of communication ports is equal to a ratio of an individual speed of the given communication port to a combined port speed for the network team;
      distributing a communication load of the network team in accordance with the priority such that each communication port carries a percentage of the communications load that is equal to the priority configured for that communications port; and
      dynamically modifying the priority of at least one communication port in response to real-time network statistics indicating a change in the individual speed at which that at least one communication port is carrying a first percentage of the communication load such that that at least one communication port carries a second percentage of the communication load that is different from the first percentage of the communication load.

15. The system of claim 14, wherein the plurality of communications ports comprises a first communications port and a second communications port, and wherein the priority of the first communications port is equal to a ratio of a maximum individual speed of the first communication port to a maximum combined port speed for the network team such that first communications port carries a percentage of the communications load that is equal to the ratio of the maximum individual speed of the first communication port to the maximum combined port speed for the network team, and wherein the priority of the second communications port is equal to a ratio of a maximum individual speed of the second communication port to the maximum combined port speed for the network team such that second communications port carries a percentage of the communications load that is equal to the ratio of the maximum individual speed of the second communication port to the maximum combined port speed for the network team.

16. The system of claim 14, wherein the priority is also assigned based on a reliability factor of the at least one NIA.

* * * * *